UNITED STATES PATENT OFFICE 2,198,166

ARYLO-PYRROLINETHIONE COMPOUNDS AND PROCESS OF PRODUCING

William Edward Hanford, Wilmington, Del., assignor to E. I. du Pont de Nemours & Company, Wilmington, Del., a corporation of Delaware No Drawing. Application September 15, 1938, Serial No. 230,146

10 Claims. (Cl. 260—319)

This invention relates to organic compounds, more particularly to heterocyclic carbon compounds and still more particularly to $\Delta^5,\Delta^{5'}$-bis(3,4-arylo-2-pyrrolinethione)s, and their preparation. It relates specifically to $\Delta^5,\Delta^{5'}$-bis(3,4-benzo-2-pyrrolinethione) and its preparation.

This invention has an object the provision of a process for the preparation of new compounds. A further object is the preparation of compounds useful as acid inhibitors in the pickling of metals. Other objects will appear hereinafter.

These objects are accomplished by the following invention wherein an aromatic dinitrile wherein the two nitrile groups are directly attached to adjacent ring carbons is reacted with hydrogen sulfide, preferably in the presence of a basic, ammonia-type compound having at least one hydrogen on the ammonia-type nitrogen atom, the valences of which, when not satisfied by hydrogen, are satisfied by aliphatic carbon.

In the preferred mode of carrying out the invention one molar weight of an aromatic dinitrile of the above type and about eight hundred parts (by weight) of a solvent such as ethanol are placed in a container provided with a mechanical stirrer and a tube for the introduction of gas below the surface of the liquid. A brisk stream of ammonia gas is passed into the stirred liquid for five to ten minutes. The stream of ammonia is then replaced by a brisk stream of hydrogen sulfide, the temperature being raised to 55 to 60° C. After three to four hours, the introduction of hydrogen sulfide is discontinued, and the reaction mixture is boiled until it is free of ammonia and hydrogen sulfide. The original volume is maintained during the boiling by addition of ethanol. The hot reaction mixture is filtered with suction, and the crude product thus obtained is purified by washing with carbon disulfide and subsequently drying. The yield is high (up to 95%) and the product of good quality.

The more detailed practice of the invention is illustrated by the following examples, wherein parts given are by weight. There are of course many forms of the invention other than these specific embodiments.

EXAMPLE I

No catalyst

A brisk stream of hydrogen sulfide is passed into a solution of 3 parts of phthalonitrile in 50 parts of ethanol maintained at 60° C. in a suitable vessel. During the first five minutes no change is noted. Then the solution slowly darkens till after ten minutes it is dark reddish-brown, whereupon application of heat is discontinued. As the stream of hydrogen sulfide continues, the temperature rises slightly till after twelve minutes it is 61° C. and a brown precipitate starts to form. After fifteen minutes the temperature rises to 63.5° C. and the precipitate becomes quite voluminous. The temperature then starts to fall and is 60° C. after twenty minutes, 50° C. after twenty-five minutes, 45° C. after twenty-seven minutes, 43° C. after twenty-eight minutes, and 38° C. after thirty minutes. The stream of hydrogen sulfide is discontinued, and the reaction mixture boiled for three minutes and filtered hot. The precipitate of $\Delta^5,\Delta^{5'}$-bis(3,4-benzo-2-pyrrolinethione) is washed with boiling chloroform and dried. The yield is 2.8 parts or 82% of the theoretical. After purification by washing with carbon disulfide, this compound is found on analysis to contain 20.66% S and 9.47% N, the values calculated for $C_{16}H_{10}S_2N_2$ being 21.77% S and 9.31% N. The formula of the product is

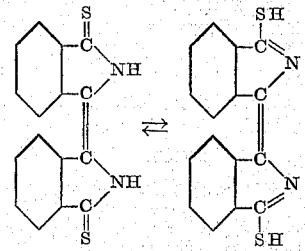

EXAMPLE II

Ammonia catalyst

A brisk stream of hydrogen sulfide is passed into a solution of 3 parts of phthalonitrile in 50 parts of ethanol containing 0.03 part of a 28% solution of ammonia in water, and maintained at 60° C. in a suitable vessel. The solution immediately begins to darken and after three minutes is dark reddish-brown, whereupon application of heat is discontinued. As the stream of hydrogen sulfide is continued the temperature drops slightly till after four minutes it is 59° C. and a brown precipitate starts to form. The precipitate becomes more voluminous and the temperature falls gradually to 58.5° C. after six minutes, 58° C. after ten minutes, 54° C. after thirteen minutes, 51° C. after fifteen minutes, 48° C. after seventeen minutes, and 43° C. after twenty minutes. The stream of hydrogen sulfide is discontinued and the $\Delta^5,\Delta^{5'}$-bis-(3,4-benzo-2-pyrrolinethione) formed is isolated as in Example I, above. The yield is 2.6 parts or 76% of the theoretical.

EXAMPLE III

Butylamine catalyst

The reaction is carried out as in Example II, using 3 parts of phthalonitrile, 50 parts of ethanol, and 0.06 part of n-butylamine. The reaction proceeds at about the same rate as in Example II; the brown precipitate appears after four minutes and the temperature remains about 60° C. for ten minutes and then drops and is 43° C. after twenty minutes. The yield of $\Delta^5,\Delta^{5'}$-bis(3,4-benzo-2-pyrrolinethione) is 2.3 parts or 67% of the theoretical.

EXAMPLE IV

Dibutylamine catalyst

The reaction is carried out as in Example II, using 3 parts of phthalonitrile, 50 parts of ethanol, and 0.06 part of di-n-butylamine. The reaction proceeds at about the same rate as in Example II; the brown precipitate appears after four minutes and the temperature remains about 60° C. for ten minutes and then drops and is 43° C. after twenty minutes. The yield of $\Delta^5,\Delta^{5'}$-bis(3,4-benzo-2-pyrrolinethione) is 2.6 parts or 76% of the theoretical.

EXAMPLE V

Piperidine catalyst

In a suitable vessel, 40 parts of ethanol containing 3 parts of phthalonitrile is heated to 60° C. while a brisk stream of hydrogen sulfide is passed into it. There is no noticeable color change. The nitrile does not go entirely into solution. Six hundredths (0.06) part of piperidine is then added and the solution immediately darkens and the nitrile goes completely into solution. The application of heat is discontinued, but the temperature of the solution remains about 60° C., and a brown precipitate forms. About ten minutes after the amine is added, the temperature begins to drop. The mixture is then heated to boiling and filtered hot. The precipitate of $\Delta^5,\Delta^{5'}$-bis(3,4-benzo-2-pyrrolinethione) is washed with chloroform and dried. The yield is 2.1 parts or 61% of the theretical.

EXAMPLE VI

Ethanolamine catalyst

A brisk stream of hydrogen sulfide is bubbled into a mixture of 3 parts of phthalonitrile, 0.06 part of ethanolamine, and 40 parts of ethanol heated in a suitable vessel. As the temperature rises to 55° C. the color darkens and the nitrile goes into solution. Application of heat is discontinued, but as the stream of hydrogen sulfide is continued the temperature rises to 60° C. where it remains while a brown precipitate forms. Then the temperature begins to fall and the reaction is apparently over, requiring about fifteen minutes. The stream of hydrogen sulfide is continued for another fifteen minutes, 30 parts of ethanol added, and the mixture heated to boiling and filtered hot. The precipitate of $\Delta^5,\Delta^{5'}$-bis(3,4-benzo-2-pyrrolinethione) is washed with boiling chloroform and dried. The yield is 2.7 parts or 79% of the theoretical.

EXAMPLE VII

Ammonia catalyst

To a suspension of 6.4 parts of phthalonitrile in 80 parts of ethanol is added 9 parts of 28% aqueous ammonia. This mixture is placed in a reaction vessel, cooled in an ice bath, and saturated with hydrogen sulfide. The solution turns a deep reddish brown. The reaction vessel is sealed and heated in a furnace at 100° C. for 8 hours, after which time it is cooled, opened and the contents evaporated to dryness at about 90–100° C. The dark red solid residue is insoluble in water, benzene, acetone, and ethyl acetate, sparingly soluble in 95% aqueous ethanol and warm, dilute, aqueous alkali, and readily soluble in hot pyridine.

In this process the temperature may range from that at which the reaction begins to be detectable, usually around 50° C., up to the boiling point of the diluent used or higher if the process is carried out in a closed system under superatmospheric pressure. Best results are usually obtained at 50 to 60° C. in an open system in the presence of a liquid diluent which should be chemically inert to reactants and product, a solvent for the reactants and a solvent or non-solvent for the product. Suitable diluents include n-butyl alcohol, the amyl alcohols, dioxan, toluene, xylene,, benzene, beta-methoxyethanol, ethyl alcohol, diethyl ether, and chlorobenzene.

The process of the present invention is generally applicable to aromatic dinitriles, whether substituted or unsubstituted, in which the nitrile groups are attached to adjacent ring carbons. When substituted, the substituent is preferably one that does not react with any catalyst used or with hydrogen sulfide since this may interfere with the reaction. Thus, if the substituents are acidic, as are carboxylic acid, sulfonic acid, or phenolic hydroxyl groups, sufficient basic material must be present to neutralize the acid. Aromatic dinitriles suitable for use in this invention include phthalonitrile, 3-chlorophthalonitrile, 4-chlorophthalonitrile, 3,4-dichlorophthalonitrile, 3,5-dichlorophthalonitrile, 3,6 - dibromophthalonitrile, 4,5-dibromophthalonitrile, 3,4,5-trichlorophthalonitrile, 3,4,6-trichlorophthalonitrile, tetrabromophthalonitrile, 4-bromo - 5 - chlorophthalonitrile, 4-bromo-3,5-dichlorophthalonitrile, 3,5-dibromo-4,6-dichlorophthalonitrile, 3-aminophthalonitrile, 3,5 - diaminophthalonitrile, 3,6 - diaminophthalonitrile, 4 - methylphthalonitrile, 3,6 - dimethylphthalonitrile, 3,5-dimethylphthalonitrile, 4,5-dimethylphthalonitrile, tetramethylphthalonitrile, 5-methyl-3-tert-butylphthalonitrile, 1,2-dicyanonaphthalene, 2,3-dicyanoanthracene, acridinonitrile, and quinolinonitrile. These nitriles may be obtained in any suitable manner, as by heating the corresponding acids with ammonia in the presence of a dehydrating catalyst, or by reacting sodium cyanide with aromatic dihalides in which the halogens are attached to adjacent ring carbons.

The aromatic dinitrile may be reacted with hydrogen sulfide in the absence of a catalyst, but the reaction is preferably carried out in the presence of a catalyst which is a basic ammonia-type compound having at least one hydrogen on an ammonia-type nitrogen, any valences of which not satisfied by hydrogen are attached to aliphatic carbon, i. e. carbon not a part of an aromatic ring. Any such basic ammonia type compound may be used. The catalyst may be represented by the formula

wherein R and R' may be hydrogen, may together form a divalent radical, saturated or unsaturated, or may be monovalent alkyl or aralkyl radicals, saturated or unsaturated, cyclic or non-cyclic and substituted or unsubstituted, provided the substituent does not neutralize the basicity of the trivalent nitrogen group and thus interfere with the reaction. If the substituent is an acidic group such as a carboxylic or sulfonic acid group, sufficient basic material must be added to neutralize such acid group by forming a salt with it. For example, an aliphatic primary or secondary aminoacid would not be suitable as a catalyst, while the sodium or potassium salt of the aminoacid would be suitable.

Specific ammonia-type compounds which may be used as catalysts in this process include the following:

| | |
|---|---|
| Ammonia | n-Octadecylamine |
| Methylamine | 1-amino-2-butene |
| Ethylamine | 4-amino-1-pentene |
| Propylamine | 5-amino-1-hexene |
| n-Butylamine | Cyclobutylamine |
| Isobutylamine | Cyclopentylamine |
| Sec-butylamine | Cyclohexylamine |
| n-Amylamine | Cycloheptylamine |
| n-Hexylamine | Benzylamine |
| 3-aminohexane | 1,2,3,4-tetrahydro-1-naphthylamine |
| n-Heptylamine | |
| 2-aminoheptane | Furfurylamine |
| n-Nonylamine | Ethylenediamine |
| n-Decylamine | Hexamethylenediamine |
| Dimethylamine | Decamethylenediamine |
| Diethylamine | N,N - dimethylethylenediamine |
| Di-n-butylamine | |
| Diisobutylamine | N,N - dimethylhexamethylenediamine |
| Benzylmethylamine | |
| Diisoamylamine | N,N'-dimethylhexamethylenediamine |
| Benzylethylamine | |
| Menthylamine | 2-hydroxyethylamine |
| Morpholine | Bis(2-hydroxyethyl)amine |
| Thiomorpholine | 2,3-dihydroxypropylamine |
| Pyrroline | 2-chloroethylamine |
| Pyrrolidine | 2-bromopropylamine |
| Piperidine | Sodium 2-aminoethylsulfonate |
| Hexamethyleneimine | |
| n-Dodecylamine | Potassium 6-aminocaproate |
| n-Hexadecylamine | 2-aminoisobutyronitrile |

These may be used singly or in any desired combination. The proportions of these materials to be used in this process are not limited to those disclosed in Examples II to VII. For the most part, the yield of the desired product is not affected greatly by the amount of catalyst used; even as much as 10 per cent by weight of these catalytic materials, based on the weight of the dinitrile, may be used. However, in the case of certain primary amines, e. g. n-butylamine, less than 2 per cent, is preferably used since with larger amounts the yield of desired product is cut down by side reactions involving the amine.

The products of the present invention may be designated as $\Delta^5,\Delta^{5'}$-bis(3,4-arylo-2-pyrrolinethione)s of the general formula

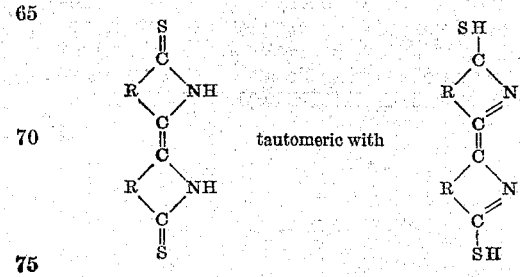

tautomeric with wherein R is a divalent aromatic residue whose valences are attached to ortho ring carbons; R thus corresponds to the aromatic dinitrile minus its two nitrile groups. Where R is symmetrical as in phthalonitrile, 2,3-dicyanonaphthalene, 3,6-dichlorophthalonitrile, tetrachlorophthalonitrile, tetraiodophthalonitrile, etc., the only structural isomers possible are the two tautomeric forms. When R is asymmetric as in 3-chlorophthalonitrile, three structural isomers with their tautomers are possible, and a mixture of these, in varying amounts, is obtained. All have the formula given above. The products in the case of 3-chlorophthalonitrile, for example, are

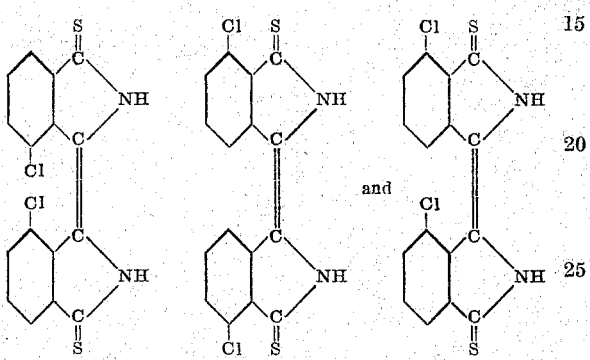

The $\Delta^5,\Delta^{5'}$-bis(3,4-benzo-2-pyrrolinethione) and related compounds prepared as described herein may be used as intermediates for further chemical syntheses. They are also useful as acid inhibitors in the pickling of metals.

This invention provides a simple, one-step process for the preparation of new and useful materials. The process can be carried out under a wide variety of conditions of temperature and pressure and in a wide variety of reaction media. Any of a wide variety of generally available substances serve as catalysts for the reaction. Thus the process is very flexible and easily adaptable to large scale use. The products are obtained in good yields and may be stored without decomposition.

The term arylo is used in the claims to represent an aromatic nucleus fused to another nucleus by adjacent carbons. The term is analogous to the prefixes benzo, naphtho, etc.

The term "aromatic" as used in the claims includes aromatic heterocyclic compounds, e. g., heterocyclic compounds of the pyridine type which have aromatic properties (Bernthsen, page 545).

The above description and examples are intended to be illustrative only. Any modification of or variation therefrom which conforms to the spirit of the invention is intended to be included within the scope of the claims.

I claim:

1. A compound of the formula

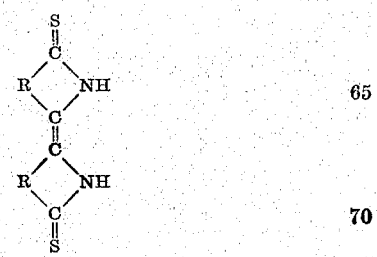

wherein R is a divalent aromatic radical whose two valences are attached to adjacent ring carbons.

2. A compound of the formula given in claim 1, in which R is mononuclear.

3. A compound of the formula

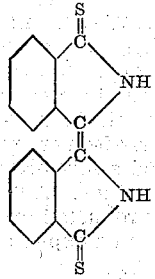

4. Process of preparing a compound of the formula

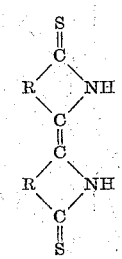

wherein R is a divalent aromatic radical whose two valences are attached to adjacent ring carbons, which comprises reacting hydrogen sulfide with an aromatic dinitrile in which the nitrile groups are attached to adjacent ring carbon atoms.

5. Process of preparing a compound of the formula

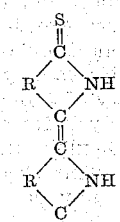

wherein R is a divalent aromatic radical whose two valences are attached to adjacent ring carbons, which comprises reacting hydrogen sulfide with an aromatic dinitrile in which the nitrile groups are attached to adjacent ring carbon atoms, in the presence of a catalytic amount of a basic compound of the class consisting of ammonia and primary and secondary amines wherein the carbons attached to the amino nitrogen are aliphatic carbons.

6. Process of preparing a compound of the formula

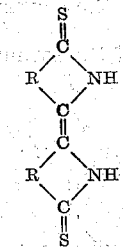

wherein R is a mononuclear divalent aromatic radical whose two valences are attached to adjacent ring carbons, which comprises reacting an ortho-phthalonitrile with hydrogen sulfide.

7. Process of preparing a compound of the formula

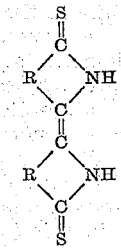

wherein R is a mononuclear divalent aromatic radical whose two valences are attached to adjacent ring carbons, which comprises reacting an ortho-phthalonitrile with hydrogen sulfide in the presence of a catalytic amount of a basic compound of the class consisting of ammonia and primary and secondary amines wherein the carbons attached to the amino nitrogen are aliphatic carbons.

8. Process of preparing a compound of the formula

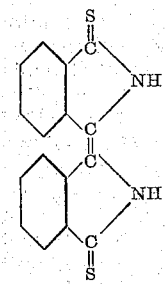

which comprises reacting phthalonitrile with hydrogen sulfide in the presence of a catalytic amount of a basic compound of the class consisting of ammonia and primary and secondary amines wherein the carbons attached to the amino nitrogen are aliphatic carbons.

9. Process of preparing a compound of the formula

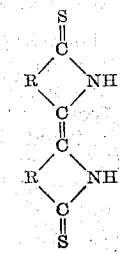

wherein R is a divalent aromatic radical whose two valences are attached to adjacent ring carbons, which comprises heating hydrogen sulfide with an aromatic dinitrile in which the nitrile groups are attached to adjacent ring carbon atoms.

10. Process of preparing a bis(3,4,arylo-2 pyrrolinethione) which comprises reacting hydrogen sulfide with an aromatic ortho-dinitrile in the presence of a catalytic amount of ammonia.

WILLIAM EDWARD HANFORD.

Certificate of Correction

Patent No. 2,198,166. April 23, 1940.

WILLIAM EDWARD HANFORD

It is hereby certified that error appears in the printed specification of the above numbered patent requiring correction as follows: Page 3, first column, lines 65 to 75 inclusive, in the formula, for

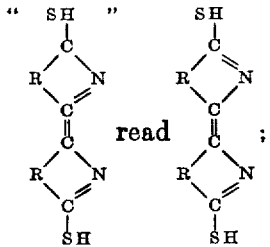

and that the said Letters Patent should be read with this correction therein that the same may conform to the record of the case in the Patent Office.

Signed and sealed this 24th day of September, A. D. 1940.

[SEAL]

HENRY VAN ARSDALE,
*Acting Commissioner of Patents.*